United States Patent [19]

Maltby et al.

[11] 4,286,680
[45] Sep. 1, 1981

[54] WEIGHING APPARATUS

[76] Inventors: Thomas F. Maltby, The Red House, Selbourne, Hampshire; Robert C. Maltby, Doscombe Cottage, Hawkley, Hampshire; Alan W. Wakefield, 13 N. Stroud La., Petersfield, Hampshire, all of England

[21] Appl. No.: 141,159

[22] Filed: Apr. 17, 1980

[30] Foreign Application Priority Data

Apr. 25, 1979 [GB] United Kingdom ............... 14474/79

[51] Int. Cl.$^3$ ........................ G01G 5/04; G01G 21/00
[52] U.S. Cl. ..................................... 177/208; 177/128
[58] Field of Search ............................... 177/208, 128

[56] References Cited

U.S. PATENT DOCUMENTS

| 3,372,764 | 3/1968 | Crotts | 177/208 |
| 3,658,142 | 4/1972 | Marshall et al. | 177/208 |
| 3,698,492 | 10/1972 | Lejeune | 177/208 X |
| 4,184,555 | 1/1980 | Maltby et al. | 177/208 |

Primary Examiner—George H. Miller, Jr.

[57] ABSTRACT

A weighing apparatus particularly for placing under a wheel of a vehicle for giving an indication of axle loading, said apparatus comprising a resilient body formed of an elastomeric material, such as rubber, a cavity being provided in the body and filled with liquid, the cavity being connected to an indicator by means of a conduit for indicating changes in volume of the cavity when the body suffers changes due to compression forces applied thereto by the member being weighed, the body has a resilient metal load plate bonded to the upper surface, a resilient metal load support plate mounted on the plate and a metal plate bonded to the body and spaced below the plate and to which reaction forces are applied during weighing, the plate is provided with a screw-threaded bore in communication with the cavity and a screw-threaded plug is in screw-threaded engagement with the bore, said plug having an inner end portion which engages with part of the wall of the cavity to prevent that part of the wall being deformed when the body suffers changes due to compression forces applied thereto by the member being weighed. By adjusting the position of the plug in the bore adjusts the deformability of the cavity to allow a common read out scale to be provided irrespective of changes in the character or composition of the elastomeric material of the body.

6 Claims, 2 Drawing Figures

WEIGHING APPARATUS

BACKGROUND OF THE INVENTION

This invention relates to a weighing apparatus and particularly, but not exclusively, to a portable weighing apparatus for weighing vehicles.

In our copending United Kingdom Patent Application No. 30592/78 (Publication No. 2001766A) we have described and claimed a weighing apparatus which comprises a resilient body formed of an elastomeric material, a closed cavity provided in said body, a fluid contained in said cavity, conduit means connecting the cavity to indicator means for indicating changes in volume of the cavity when the body suffers changes due to compression forces applied thereto by the member being weighed, said body having a resilient metal plate or bars fixed to an upper surface thereof, a resilient metal load support plate mounted on said first mentioned plate or bars and a further resilient metal plate embedded in the body and spaced below the first mentioned plate or bars and to which reaction forces are applied during weighing.

The properties of an elastomeric material, such as natural or synthetic rubber, change due to the effects of temperature, the composition of the elastomeric material and age. For example at low temperature the material stiffens and becomes less flexible and at high temperature the material softens and becomes more flexible. It was therefore thought necessary to provide a read-out scale for the weighing device which was calibrated to cater for the properties of the elastomeric material at a particular ambient temperature and this involved having to provide a range of differently calibrated scales from which done could be chosen for the ambient conditions in the area of use of the weighing apparatus. For example a different scale would be provided where the apparatus is in hot climates compared with the scale used in cold climates. Also, there may be composition changes between batches of elastomeric material and therefore a calibrated scale for a weighing apparatus formed from one batch could not necessarily be used on a weighing apparatus formed from another batch.

We have found that if the deformity of the wall of the cavity can be changed then a common calibrated read-out scale can be used under a wide range of ambient temperature conditions, and for weighing apparatus formed of different compositions of elastomeric material, and thus obviate the need to have a plurality of differently calibrated scales available.

SUMMARY OF THE INVENTION

This invention relates as aforesaid to weighing apparatus.

An object of the invention is to provide a weighing apparatus having a body formed of an elastomeric material and having therein a cavity whose deformability can be adjusted.

According to the present invention there is provided a weighing apparatus comprising a resilient body formed of an elastomeric material, a cavity provided in said body, a fluid contained in said cavity, conduit means connecting the cavity to indicator means for indicating changes in volume of the cavity when the body suffers changes due to compression forces applied thereto by the member being weighed, said body having a resilient metal plate bonded to an upper surface thereof, a resilient metal load support plate mounted on said first mentioned plate and a further resilient metal plate bonded to the body and spaced below the first mentioned plate and to which reaction forces are applied during weighing, said first mentioned plate or said further plate being provided with a screw-threaded bore in communication with the cavity, and a screw-threaded closure plug in screw-threaded engagement with the screw-threaded bore, said closure plug having an inner end portion which engages with part of the wall of the cavity to prevent that part of the wall being deformed when the body suffers changes due to compression forces applied thereto by the member being weighed.

Therefore by adjusting the position of the closure plug in the bore adjusts the deformability of the cavity by controlling the surface of the cavity which can be deformed.

Preferably the inner end of said inner end portion of the closure plug is provided with an outwardly directed circumferentially extending sealing lip whose outer diameter is slightly greater than the diameter of the cavity.

The closure plug may be provided with means to cater for changes in the volume of the fluid in the cavity due to changes in temperature.

BRIEF DESCRIPTION OF THE DRAWINGS

To the accomplishment of the foregoing and related ends, the invention then comprises the features hereafter fully described and particularly pointed out in the claims, the following description and annexed drawing setting forth in detail certain illustrative embodiments of the invention, these being indicative however of only some ways in which the principle of the invention may be employed.

In said annexed drawings.

DESCRIPTION OF THE PREFERRED EMBODIMENTS

Figure 1:
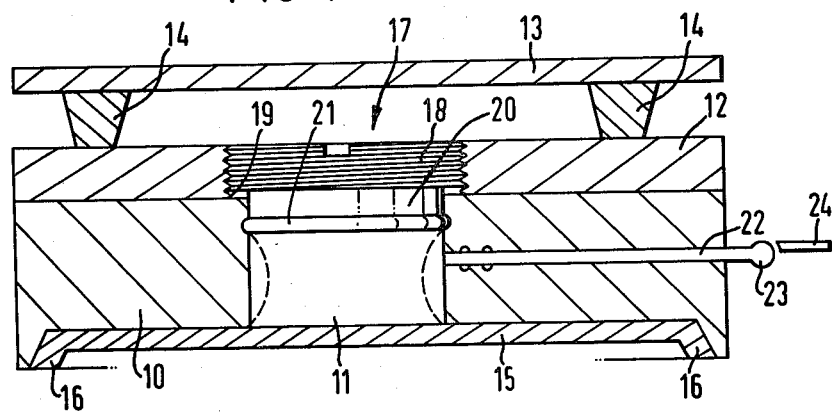
FIG. 1 is a diagrammatic cross-section through a weighing apparatus according to the present invention.

The weighing apparatus has a body 10 formed of an elastomeric material, such as natural or synthetic rubber or resilient plastics material. Preferably the body 10 is formed of a polybutadiene synthetic rubber. The side of the body, not shown, are inclined to form ramps. A cavity 11 is formed in the body 10.

Embedded in the body 10 and extending over the cavity 11 is a yieldable metal plate 12 which is bonded to the body 10 by any suitable bonding material. Mounted on the plate 12 is a top metal plate 13 which is spaced from the plate 12 by bearing pads 14 formed of an elastomeric material. The plate 13 can therefore move relative to the plate 12 and cannot be brought into direct contact with the plate 12. Any downward load applied to the plate 13 is always applied to the plate 12 through two fixed points, i.e. through the pads 14, irrespective of the position of application of the load to the plate 13, i.e. any eccentrically applied load to the plate 13 will always pass through two fixed points.

Embedded in the body 10 is a bottom metal plate 15 which is bonded to the body 10. The plate 15 is provided on its underside with flanges 16 forming load reaction points.

The cavity 11 is closed by a closure plug 17 having a screw-threaded portion 18 which engages with a screw-threaded bore 19 provided in the plate 12. The plug 17 has a downwardly extending portion 20 whose diameter is equal to that of the cavity 11 and the bottom end of the portion 20 is provided with an outwardly directed circumferentially extending sealing lip 21 whose outer diameter is slightly greater than that of the cavity 11.

Extending from the cavity 11 is a passageway formed by a metal tube 22 which is connected to a read out tube 23 which extends along a handle, not shown, and extending parallel with the tube 23 is a calibrated scale 24. The cavity 11, passageway formed by the tube 22, and tube 23 contain a liquid. Preferably they contain a liquid which comprises either an ethyleneglycol based liquid or an alcohol-glycerine based liquid. The passageway 22 is preferably connected to a chamber (not shown) whose volume can be adjusted in order for the liquid in the tube 23 to be adjusted to zero on the scale 24. This is necessary to cater for expansion or contraction of the liquid in the cavity etc. due to ambient temperature changes.

Alternatively it is possible for the plug 17 to be provided with means for adjusting the liquid in the liquid circuit for adjusting that in the tube 23 to zero on the scale 24.

In use of the weighing apparatus a vehicle wheel is run up one of the inclined sides of the body 10 and brought to rest on the plate 13. The plate 13 will bend slightly due to the load applied to it and the load is applied through the pads 14 to the plate 12. The body 10 is compressed between the plates 12, 15 and the wall of the cavity 11 distorts inwardly as shown by the dotted lines thus reducing the volume of the cavity 11 causing the gas or liquid to be forced along the passage 22 and tube 23. The position of the end of the column of liquid or gas in the tube 23 is read against the scale 24 which is calibrated in terms of weight and therefore the wheel or axle loading of the vehicle can be readily seen. The weighing device can be of a length sufficient for twin wheels of a vehicle to be placed on the plates 13.

To weigh a vehicle, such as a lorry, two weighing apparatus are placed on the ground at the spacing of the front wheels of the vehicle and the vehicle is moved until the front wheels rest on the plates 13 of the two weighing apparatus. The readings of the scales 24 of both weighing apparatus are then noted. The rear wheels of the vehicle are then moved onto the plates 13 of the two weighing apparatus and again the readings of both apparatus are noted. A summation of all the readings will give an accurate indication of the total weight of the vehicle. The summation of each pair of readings will give the weight upon each axle.

The properties of the elastomeric material of the body 10 will vary due to the effects of temperature, the composition of the material and age. Therefore the body 10 may be too stiff or too flexible to suit the calibration of the scale 24. This is overcome by adjusting the deformity of the wall of the cavity 11. When the plug 17 is screwed into the bore 19 the lip 21 is forced into sealing engagement with the wall of the cavity to prevent liquid or gas leakage. The portion 20 overlaps a part of the wall of the cavity 11 and in the overlapping region the cavity wall cannot be deformed as it is supported by the portion 20. Therefore by screwing the plug 17 inwardly or outwardly adjusts the deformability of the wall of the cavity and therefore a calibrated scale 24 can be provided which does not have to be changed due to changes in the elastomeric material. Therefore when a plurality of bodies 10 are formed from slightly different mixes of elastomeric material or when they are to be subjected to different ambient temperatures a common scale 24 can be used for all the weighing apparatuses produced.

Figure 2:
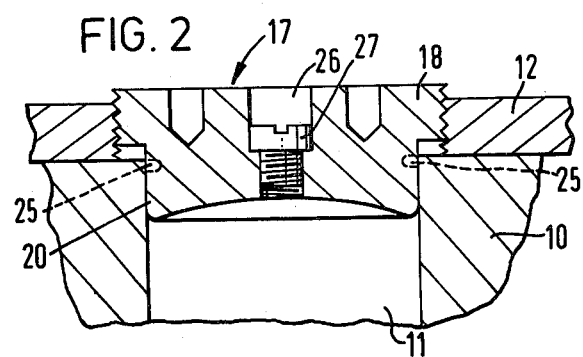
FIG. 2 is a section through part of a weighing apparatus showing an alternative form of closure plug.

FIG. 2 shows a plug 17 which is different to the one shown in FIG. 1 in that it is not provided with a lip 21. Sealing is effected by providing an integral sealing lip 25 on the upper end of the wall of the cavity 11, the lip 25 being resiliently deformed into sealing engagement with the portion 20 of the plug 17. The plug 17 shown in FIG. 2 also has a central bore 26 which is used to fill the cavity 11 with liquid, the bore being provided with a closure plug 27. The underside of the plug 17 is concave so that any air in the cavity 11 and tube 22 can collect in this region and be vented to atmosphere when the plug 26 is removed. The concave underside also prevents air bubbles being trapped on filling of the cavity 11. The upper side of the plug 17 of FIG. 2 is provided with bores 28 which can be engaged by a tool for rotating the plug 17 to adjust its position.

Instead of providing the plug 17 and bore 19 in the plate 12 they can be provided in the plate 15.

The weighing apparatus is light in weight and can easily be lifted manually and can be carried in a vehicle and used by the driver at any location to check the laden weight of his vehicle and therefore indicate to him whether the vehicle is overloaded.

Even though the apparatus has been described for weighing vehicles, it clearly can be used for weighing other things.

A plurality of weighing devices can be arranged to support a common load carrying top plate instead of individual top plates, thereby forming a weighing bridge.

Preferably the closure plug 17 is formed of metal but it may be formed of a plastics material which may be reinforced.

We, therefore particularly point out and distinctly claim as our invention:

1. A weighing apparatus comprising a resilient body formed of an elastomeric material, a cavity provided in said body, a fluid contained in said cavity, conduit means connecting the cavity to indicator means for indicating changes in volume of the cavity when the body suffers changes due to compression forces applied thereto by the member being weighed, said body having a resilient metal plate bonded to an upper surface thereof, a resilient metal load support plate mounted on said first mentioned plate and a further resilient metal plate bonded to the body and spaced below the first mentioned plate and to which reaction forces are applied during weighing, said first mentioned plate or said further plate being provided with a screw-threaded bore in communication with the cavity, and a screw-threaded closure plug in scew-threaded engagement with the screw-threaded bore, said closure plug having an inner end portion which engages with part of the wall of the cavity to prevent that part of the wall being deformed when the body suffers changes due to compression forces applied thereto by the member being weighed.

2. A weighing apparatus as claimed in claim 1, wherein the inner end of said inner end portion of the closure plug is provided with an outwardly directed circumferentially extending sealing lip whose outer diameter is slightly greater than the diameter of the cavity.

3. A weighing apparatus as claimed in claim 1, wherein the outer end of the wall of the cavity is provided with an inwardly directed circumferentially extending flexible sealing lip which seals against the periphery of the closure plug.

4. A weighing apparatus as claimed in claim 1, wherein the underside of the closure plug is concave.

5. A weighing apparatus as claimed in claim 1, wherein the closure plug is provided with a central screw-threaded bore forming a filling opening closed by a screw-threaded closure plug.

6. A weighing apparatus as claimed in claim 1, wherein the closure plug is provided with means for adjusting the liquid in the liquid circuit so as to adjust the liquid level to a zero reading on the indicator.

* * * * *